United States Patent
Buyanovskiy

(10) Patent No.: US 9,652,883 B2
(45) Date of Patent: May 16, 2017

(54) VOLUME RENDERING OF IMAGES WITH MULTIPLE CLASSIFICATIONS

(71) Applicant: FOVIA, INC., Palo Alto, CA (US)

(72) Inventor: Georgiy Buyanovskiy, San Jose, CA (US)

(73) Assignee: FOVIA, INC., Palo Alto, CA (US)

( * ) Notice: Subject to any disclaimer, the term of this patent is extended or adjusted under 35 U.S.C. 154(b) by 0 days.

(21) Appl. No.: 14/296,092

(22) Filed: Jun. 4, 2014

(65) Prior Publication Data

US 2014/0362077 A1 Dec. 11, 2014

Related U.S. Application Data

(60) Provisional application No. 61/832,705, filed on Jun. 7, 2013.

(51) Int. Cl.
| | |
|---|---|
| *G06T 19/00* | (2011.01) |
| *G06T 15/20* | (2011.01) |
| *G06T 15/50* | (2011.01) |
| *G06T 15/10* | (2011.01) |
| *G06T 15/06* | (2011.01) |
| *G06T 9/40* | (2006.01) |
| *G06T 17/00* | (2006.01) |
| *G09G 5/02* | (2006.01) |
| *G06T 15/08* | (2011.01) |
| *G06T 19/20* | (2011.01) |

(52) U.S. Cl.
CPC ............. *G06T 15/08* (2013.01); *G06T 9/40* (2013.01); *G06T 17/005* (2013.01); *G06T 19/20* (2013.01); *G06T 2210/62* (2013.01); *G06T 2219/2012* (2013.01)

(58) Field of Classification Search
CPC ....... G06T 19/00; G06T 15/20; G06T 15/503; G06T 15/10; G06T 3/4007; G06T 15/06; G06T 2210/62; G06T 9/40; G06T 17/005; G09G 5/02; G06F 17/5018; G06J 1/00
USPC ............... 345/419, 427, 581, 589, 592, 608; 382/300; 703/2; 708/3
See application file for complete search history.

(56) References Cited

U.S. PATENT DOCUMENTS

2006/0274065 A1* 12/2006 Buyanovskiy ................ 345/424
2008/0284781 A1* 11/2008 Wenger ................... G06T 15/08
                                                                                                 345/424
2012/0280994 A1 11/2012 Buyanovskiy

OTHER PUBLICATIONS

International Preliminary Report on Patentability received for PCT Patent Application No. PCT/US2014/040921, mailed on Dec. 17, 2015, 6 pages.
International Search Report & Written Opinion received for PCT Patent Application No. PCT/US2014/040921, mailed on Nov. 20, 2014, Nov. 20, 2014, 9 pages.

(Continued)

*Primary Examiner* — Ke Xiao
*Assistant Examiner* — Andrew Shin
(74) *Attorney, Agent, or Firm* — Morrison & Foerster LLP

(57) ABSTRACT

Processes and systems for computer enabled volume data rendering, and more particularly for volume rendering of multiple classificated volume datasets using an Interpolation-Classification (IC) order are provided. Further, an octree min/max can be used for volume rendering with the multiple classifications and at the same time applying the IC order to visualize the multiple classifications volume rendering.

17 Claims, 4 Drawing Sheets

(56) References Cited

OTHER PUBLICATIONS

Beyer et al., "High-Quality Multimodal Volume Rendering for Preoperative Planning of Neurosurgical Interventions", IEEE Transactions on Visualization and Computer Graphics, vol. 13, No. 6, Nov./Dec. 2007, pp. 1696-1703.
Engel et al., "High-Quality Pre-Integrated Volume Rendering Using Hardware-Accelerated Pixel Shading", Proceedings ACM Siggraph, 2001, 9 pages.
Hadwiger et al., "High-Quality Two-Level Volume Rendering of Segmented Data Sets on Consumer Graphics Hardware", Proceedings of the 14th IEEE Visualization Conference, Oct. 19-24, 2003, pp. 301-308.
Link et al., "Multi-Resolution Volume Rendering with per Object Shading", Vision, Modeling, and Visualization, Edited by Kobbelt et al., Nov. 22-24, 2006, pp. 185-191.

\* cited by examiner

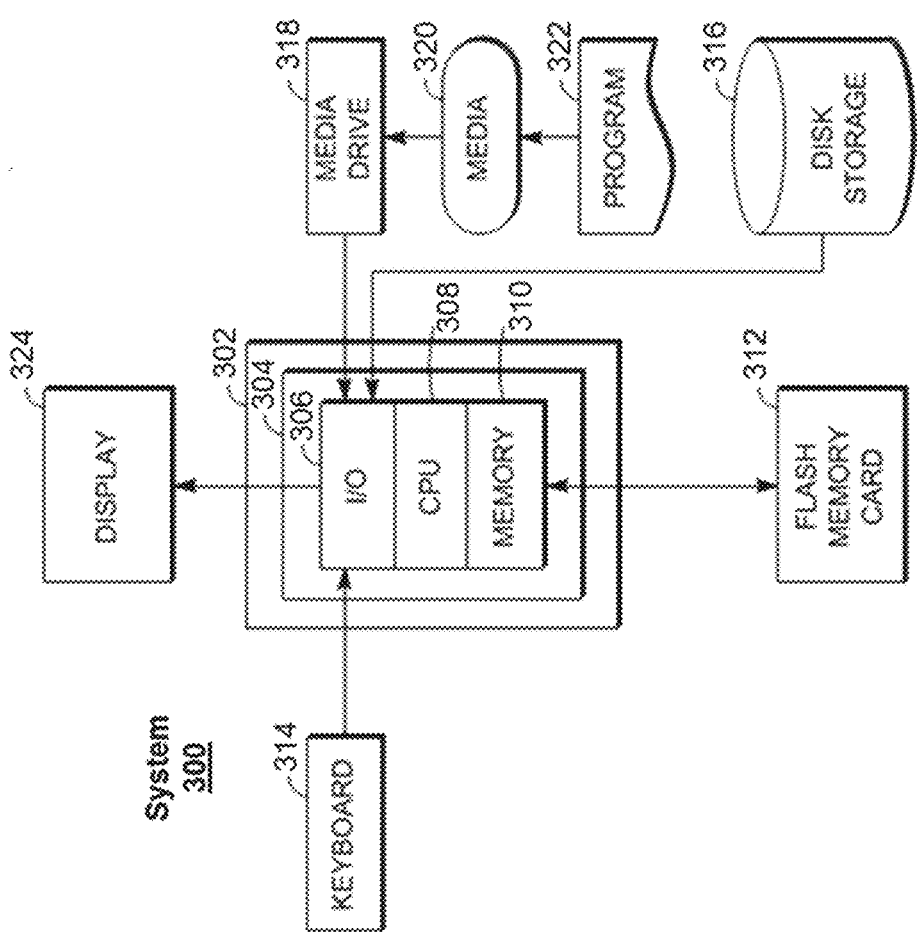

VOLUME RENDERING OF IMAGES WITH MULTIPLE CLASSIFICATIONS

CROSS-REFERENCE TO RELATED APPLICATION

This application claims priority to U.S. Provisional Patent Application Ser. No. 61/832,705, filed on Jun. 7, 2013, which is incorporated by reference herein in its entirety for all purposes.

FIELD

This disclosure relates to depiction of images of objects using computer enabled imaging, and especially to the multiple classification volume rendering aspects of computer enabled imaging.

BACKGROUND

Visualization of volumetric objects which are represented by three dimensional scalar fields is one of the most complete, realistic, and accurate ways to represent internal and external structures of real 3-D (three dimensional) objects.

As an example, Computer Tomography (CT) digitizes images of real 3-D objects and represents them as a discrete 3-D scalar field representation. MRI (Magnetic Resonant Imaging) is another system to scan and depict internal structure of real 3-D objects.

As another example, the oil industry uses seismic imaging techniques to generate a 3-D image volume of a 3-D region in the earth. Some important geological structures, such as faults or salt domes, may be embedded within the region and are not necessarily on the surface of the region.

Direct volume rendering is a computer enabled technique developed for visualizing the interior of a solid region represented by such a 3-D image volume on a 2-D image plane, e.g., displayed on a computer monitor, Hence a typical 3-D dataset is a group of 2-D image "slices" of a real object generated by the CT or MRI machine or seismic imaging, Typically the scalar attribute or voxel (volume element) at any point within the image volume is associated with a plurality of classification properties, such as color—red, green, blue—and opacity, which can be defined by a set of lookup tables. A plurality of rays is cast from the 2-D image plane into the volume and they are attenuated or reflected by the volume. The amount of attenuated or reflected ray energy of each ray is indicative of the 3-D characteristics of the objects embedded within the image volume, e. g., their shapes and orientations, and further determines a pixel value on the 2-D image plane in accordance with the opacity and color mapping of the volume along the corresponding ray path. The pixel values associated with the plurality of ray origins on the 2-D image plane form an image that can be rendered by computer software on a computer monitor. A more detailed description of direct volume rendering is described in "Computer Graphics Principles and Practices" by Foley, Van Dam, Feiner and Hughes, 2nd Edition, Addison-Wesley Publishing Company (1996), pp 1134-1139.

In the CT example discussed above, even though a doctor using MRI equipment and conventional methods can arbitrarily generate 2-D image slices/cuts of, e.g., a heart by intercepting the image volume in any direction, no single image slice is able to visualize the whole surface of the heart. In contrast, a 2-D image generated through direct volume rendering of the CT image volume can easily reveal on a computer monitor the 3-D characteristics of the heart, which is very important in many types of cardiovascular disease diagnosis. Similarly in the field of oil exploration, direct volume rendering of 3-D seismic data has proved to be a powerful tool that can help petroleum engineers to determine more accurately the 3-D characteristics of geological structures embedded in a region that are potential oil reservoirs and to increase oil production significantly.

One of the most common and basic structures used to control volume rendering is the transfer function. In the context of volume rendering, a transfer function defines the classification/translation of the original pixels of volumetric data (voxels) to its representation on the computer monitor screen, particularly the commonly used transfer function representation which is color—red, green, blue—and opacity classification (color and opacity), Hence each voxel has a color and opacity value defined using a transfer function. The transfer function itself is mathematically, e.g., a simple ramp, a piecewise linear function or a lookup table. Computer enabled volume rendering as described here may use conventional volume ray tracing, volume ray casting, splatting, shear warping, or texture mapping. More generally, transfer functions in this context assign renderable (by volume rendering) optical properties to the numerical values (voxels) of the data-set. The opacity function determines the contribution of each voxel to the final (rendered) image.

There are two typical methods/orders to apply classification information (to apply transfer functions):

Classification-Interpolation (CI)—First apply classification information (e.g., red, green, blue, opacity) to the data grids (pixels/voxels) and after that perform interpolation of these x4 values to get a sample. This order is called Classification-Interpolation (CI). Since the interpolation has performed upon already classified data, the "sampling theorem" ensures that two samples per voxel/cell are enough, therefore, in case of CI, the rendering quality does not get higher for increasingly higher sampling density along a ray.

Interpotation-Classification (IC)—First interpolate the original data and after that apply the classification information to the result of interpolation. This order is called interpolation-Classification (IC). IC provides an increasingly higher quality volume rendering for higher sampling density.

One of the most common procedures in volume rendering visualization is to visualize the result of segmentation wherein the same data values should be assigned to the different transfer functions; for example: left and right kidney values may be linked/segmented to a different transfer functions to make them appear differently when displayed. Therefore, to visualize the result of segmentation, the group of pixels of data should be linked/associated/segmented to the different transfer functions.

There are generally two major issues to apply multiple transfer functions to volume rendering:

A min/max octree, traditionally used to speed up volume rendering, generally needs a mechanism to deal with different classifications represented in each sub-volume since multiple transfer functions offer a multiple interpretations of sub-volume contribution (min/max can be translated differently by different transfer functions).

The CI order solves naturally the multiple classifications since classification is applied before interpolation and the CI order is traditionally used to visualize multiple classifications, however CI generally provides lower rendering quality than IC.

Therefore, it is desired to addressed these two issues for applying multiple transfer functions to volume rendering

BRIEF SUMMARY

The present disclosure relates generally to the field of computer enabled volume data rendering, and more particularly to a method and system for volume rendering of multiple classificated volume datasets. One embodiment is a method and system for volume rendering of multiple classificated volume datasets using Interpolation-Classification (IC) order, and in one example, using an octree min/max speedup for volume rendering with multiple classifications and at the same time applying an IC order (instead of traditionally used CI order) to visualize multiple classifications volume rendering.

In one aspect, exemplary processes and systems extend the min/max information for every octree node by bit-field extension representing the presence or absence of at least one pixel of data in a corresponding sub-volume associated to the correspondent transfer function. For example, a computer enabled method for depicting an image includes providing a data-set representing an image in three dimensions, wherein the data-set includes a plurality of elements. The method further includes providing a plurality of transfer functions, each defining a correspondence of scalar field value (e.g., pixel values) and a correspondent color and opacity, wherein each of multiple transfer functions is associated or linked with subset of elements of data (e.g., a group of pixels) and allows for control of the color and opacity for a correspondent group of pixels (e.g., a subset of elements of data). Each of the plurality of transfer functions is associated or linked with a correspondent group of pixels via an extended octree structure comprising a bit-field extension with min/max values for each node of the extended octree structure, and each bit in the bit-field extension represents a presence or absence of at least one pixel of data in correspondent sub-volume associated or linked to the correspondent transfer function.

Additionally, systems and electronic devices are provided having at least one processor and memory, the memory comprising computer readable instructions for causing the electronic device to perform the processes described herein. Further, computer readable storage medium, comprising computer readable instructions for causing the processes described herein are provided.

BRIEF DESCRIPTION OF THE DRAWINGS

FIG. 4 illustrates an exemplary computing system configured to perform describes processes.

DETAILED DESCRIPTION OF THE INVENTION

The aforementioned features and advantages of the invention as well as additional features and advantages thereof will be more clearly understood hereinafter as a result of a detailed description of embodiments of the invention when taken in conjunction with the drawings. The description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Figure 1:
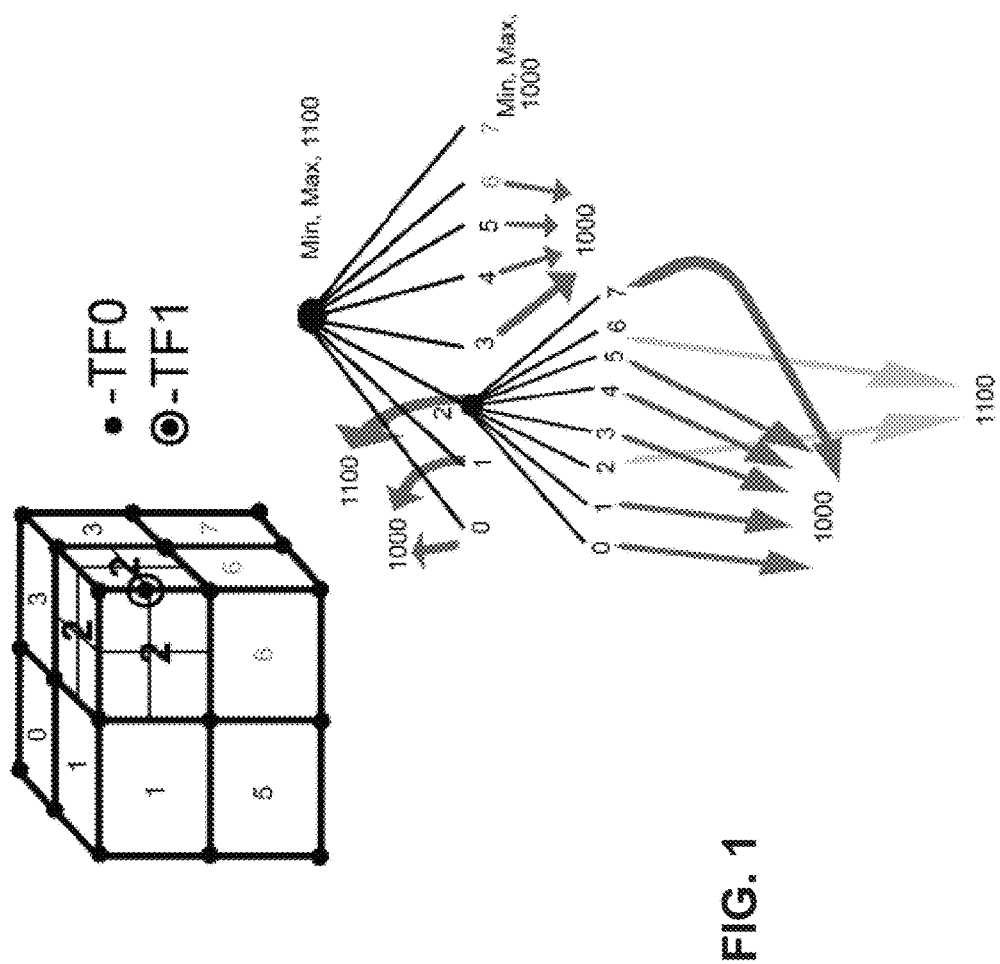
FIG. 1 illustrates an extension of an octree node by bit-field representing the presence or absence of at least one pixel of data in correspondent sub-volume associated/linked to the correspondent transfer function.

FIG. 1 illustrates the bit-fields for every node of an octree representing the presence or absence of at least one pixel of data in correspondent sub-volume associated or linked to the correspondent transfer function. Specifically, FIG. 1 shows the case with two Transfer Functions TF0 and TF1 where TF1 is assigned to a single pixel and all of the other pixels are assigned to TF0. This particular example allocates x4 (four) possible TFs but only x2 (two) are used. Generally, the application defines the number of possible TFs and correspondingly the number of bits in bit-fields; for example, the number of Transfer Functions can be determined by the needs of a particular application and limited by available memory. FIG. 1 illustrates an example with x4 bit-fields extension for each octree node therefore, maximum x4 TFs can be applied; however, only TF0 & TF1 are shown as an example "1100".

Figure 2:
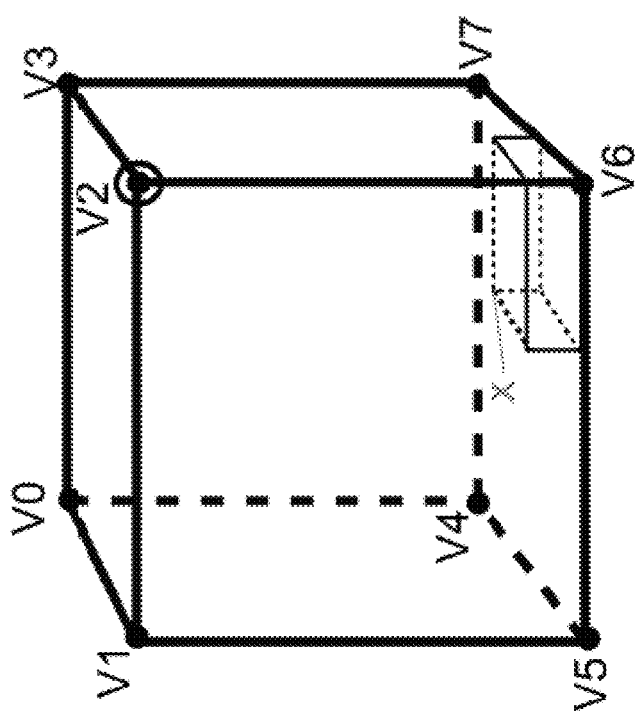
FIG. 2 illustrates the Classification Interpolation (CI) order for multiple classification volume rendering case and Interpolation Classification (IC) order for multiple classification volume rendering case.

FIG. 2 helps to illustrate the example of IC order. This particular example assigns TF1 to cell node #2 ("V2"), with all of the remaining corners of the cell assigned to TF0.

TI(p0 . . . p7)=Trilinear-Interpolation (p0, p1, p2, p3, p4, p5, p6, p7)

v'=TI (v0, v1, v2, v3, v4, v5, v6, v7)

R'=TI (R0(v'), R0(v'), R1(v'), R0(v'), R0(v'), R0(v'), R0(v'), R0(v'))

G'=TI (G0(v'), G0(v'), G1(V), G0(v'), G0(v'), G0(v'), G0(v'), G0(v'))

B'=TI (B0(v'), B0(v'), B1(v'), B0(v'), B0(v'), B0(v'), B0(v'), B0(v'))

O'=TI (O0(v'), O0(v'), O1(v'), O0(v'), O0(v'), O0(v'), O0(v'), O0(v'))

FIG. 2 illustrates the example of CI order. This particular example assigns TF1 to cell node #2, with all of the remaining corners of the cell assigned to TF0.

TI(p0 . . . p7) =Trilinear-Interpolation (p0, p1, p2, p3, p4, p5, p6, p7)

R'=TI (R0(v0), R0(v1), R1(v2), R0(v3), R0(v4), R0(v5), R0(v6), R0(v7))

G'=TI (G0(v0), G0(v1), G1(v2), G0(v3), G0(v4), G0(v5), G0(v6), G0(v7))

B'=TI (B0(v0), B0(v1), B1(v2), B0(v3), B0(v4), B0(v5), B0(v6), B0(v7))

O'=TI (O0(v0), O0(v1), O1(v2), O0(v3), O0(v4), O0(v5), O0(v6), O0(v7))

Figure 3:
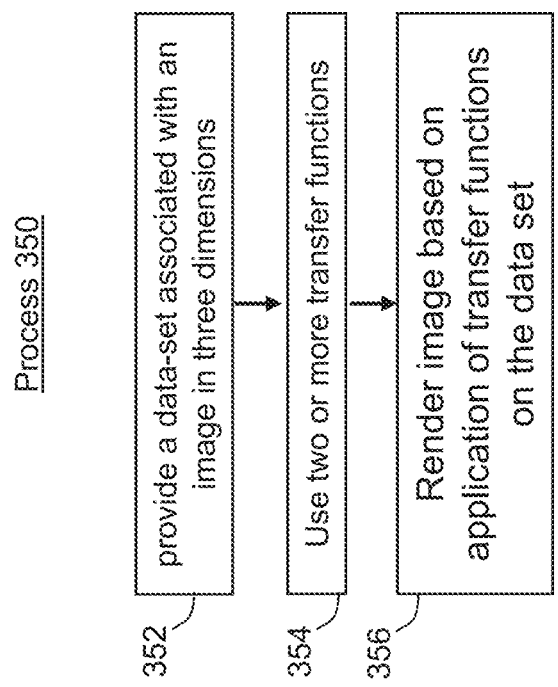
FIG. 3 illustrates an exemplary process for volume rendering.

FIG. 3 illustrates an exemplary process 350 for volume rendering. The exemplary process begins at 352 by providing a data-set associated with an image in three dimensions, e.g., a 3-dimensional image of a heart. The data set includes a plurality of elements, for example, a plurality of 2D images representing slices across a patient's left and right kidneys. The process, at 354, further uses two or more transfer functions, where each transfer function defines a correspondence of scalar field values (e.g., pixel values) to a color values and opacity values. The number of Transfer Functions may be determined by application needs and limited only by available memory, for instance, the two kidney example may require x2 (two) TFs to show them differently but it's not limited and more TFs may be used if different parts of each kidney are desired to be shown differently. Each of the transfer functions is further associated with a subset of elements of data (e.g., of a group of pixels) for controlling the color and opacity thereof. For example, each subset of elements can be associated with a different element to be rendered, such as the left or right kidney, different organs, and so on. Each of the transfer functions can further be associated with octree structure having a bit-field extension with min/max values for each node, for example, as illustrated in FIG. 1. Finally, process 350, after applying the transfer functions to the data set, cause an image to be rendered and displayed based thereon at 356.

FIG. 4 illustrates an exemplary computing system 300 configured to perform any one of the above-described processes, and which may represent a client device, server, gateway, router, data application service, for example, is provided below. In this context, computing system 300 may include, for example, a processor, memory, storage, and input/output devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, firmware, or some combination thereof.

The exemplary computing system 300 includes a number of components that may be used to perform the above-described processes. The main system 302 includes a motherboard 304 having an input/output ("I/O") section 306, one or more central processing units ("CPU") 308, and a memory section 310, which may have a flash memory card 312 related to it. The I/O section 306 is connected to a display 324, a keyboard 314, a disk storage unit 316, and a media drive unit 318. The media drive unit 318 can read/write a computer-readable medium 320, which can contain programs 322 and/or data.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments. All such modifications are intended to be within the scope of claims associated with this disclosure.

I claim:

1. A computer enabled method of depicting an image, comprising the acts of:
   providing a data-set representing an image in three dimensions, wherein the data-set represents a single volume and includes a plurality of elements;
   applying a plurality of transfer functions to the data set by casting rays through the single volume in a volume rendering process, each of the plurality of transfer functions defining a correspondence of scalar field value and a correspondent color and opacity, wherein:
      each of the plurality of transfer functions is associated with subset of elements of data for controlling the color and opacity for a corresponding group of pixels,
      each of the plurality of transfer functions is associated with a correspondent group of pixels via an extended octree structure comprising a bit-field extension with multiple bit values, each bit value defining a transfer function in the plurality of transfer functions, at each node of the extended octree structure, and
      each bit in the bit-field extension represents a presence or absence of at least one pixel of data in correspondent sub-volume associated to the correspondent transfer function; and
   displaying an image at a display device based on the data set after the applying the plurality of transfer functions to the data set.

2. The method of claim 1, further comprising performing interpolation after applying the plurality of transfer functions to the data set.

3. The method of claim 2, further comprising rendering an image based on applying the plurality of transfer functions to the data set.

4. The method of claim 2, wherein performing the interpolation comprises performing a trilinear interpolation after applying the plurality of transfer functions to x8 surrounding vertexes/pixels.

5. The method of claim 1, further comprising rendering an image based on applying the plurality of transfer functions to the data set.

6. The method of claim 1, wherein the acts are performed at a computing device comprising one of more processors and a memory.

7. The method of claim 1, wherein the acts are performed at a computing device comprising a computer readable medium storing a projection produced by the acts.

8. A non-transitory computer readable medium having instructions stored thereon, the instructions, when executed by one or more processors of a computing system, cause the computing system to:
   provide a data-set representing an image in three dimensions, wherein the data-set represents a single volume and includes a plurality of elements;
   apply a plurality of transfer functions to the data set by casting rays through the single volume in a volume rendering process, each of the plurality of transfer functions defining a correspondence of scalar field value and a correspondent color and opacity, wherein:
      each of the plurality of transfer functions is associated with subset of elements of data for controlling the color and opacity for a corresponding group of pixels, each of the plurality of transfer functions is associated with a correspondent group of pixels via an extended octree structure comprising a bit-field extension with multiple bit values, each bit value defining a transfer function in the plurality of transfer functions, at each node of the extended octree structure, and each bit in the bit-field extension represents a presence or absence of at least one pixel of data in correspondent sub-volume associated to the correspondent transfer function; and display an image at a display device based on the data set after the applying the plurality of transfer functions to the data set.

9. The computer readable medium of claim 8, further comprising instructions, when executed by the one or more processors of the computing system, cause the computing system to perform interpolation after applying the plurality of transfer functions to the data set.

10. The computer readable medium of claim 9, wherein performing the interpolation comprises performing a trilinear interpolation after applying the plurality of transfer functions to x8 surrounding vertexes/pixels.

11. The computer readable medium of claim 9, further comprising instructions, when executed by the one or more processors of the computing system, cause the computing system to render an image based on applying the plurality of transfer functions to the data set.

12. The computer readable medium of claim 8, further comprising instructions, when executed by the one or more processors of the computing system, cause the computing system to render an image based on applying the plurality of transfer functions to the data set.

13. Apparatus for depicting an image, comprising:
a first storage for storing a data-set representing an image in three dimensions, wherein the data-set represents a single volume and includes a plurality of elements;

a processor coupled to the first storage, the processor for applying multiple transfer functions to the dataset by casting rays through the single volume in a volume rendering process, wherein each of the plurality of transfer functions defines a correspondence of scalar field value and a correspondent color and opacity, each of the plurality of transfer functions is associated with a subset of elements of data for controlling the color and opacity for correspondent group of pixels, each of the plurality of transfer functions is associated with correspondent group of pixels via extended octree structure comprising the bit-field extension multiple bit values, each bit value defining a transfer function in the plurality of transfer functions, at every node of octree structure, and each bit in the bit-field extension represents a presence or absence of at least one pixel of data in correspondent sub-volume associated/linked to the correspondent transfer function; and a display device for displaying an image based on the data set after the applying the plurality of transfer functions to the data set.

14. The apparatus of claim 13, wherein the processor is further configured to perform interpolation after applying the plurality of transfer functions to the data set.

15. The apparatus of claim 14, further comprising rendering an image based on applying the plurality of transfer functions to the data set.

16. The apparatus of claim 14, wherein the processor is configured to perform the interpolation comprises the processor being configured to perform a trilinear interpolation after applying the plurality of transfer functions to x8 surrounding vertexes/pixels.

17. The apparatus of claim 13, further comprising rendering an image based on applying the plurality of transfer functions to the data set.

* * * * *